Patented Dec. 24, 1946

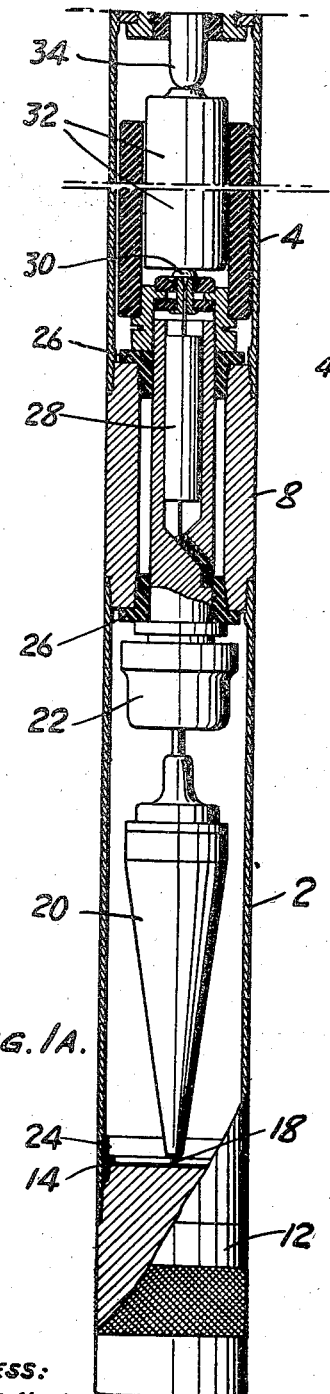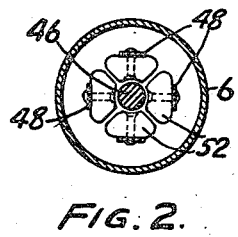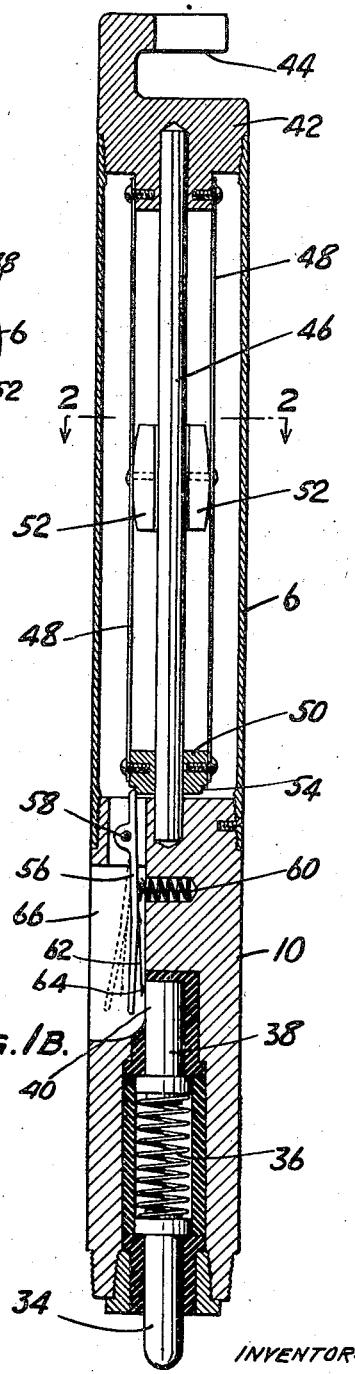

2,412,976

UNITED STATES PATENT OFFICE 2,412,976

WELL SURVEYING INSTRUMENT

William H. Emerson, Long Beach, and Donald Hering, South Gate, Calif., assignors to Sperry-Sun Well Surveying Company, Philadelphia, Pa., a corporation of Delaware Application January 16, 1942, Serial No. 426,998

6 Claims. (Cl. 33—205.5)

This invention relates to a well surveying instrument, and has particular reference to the surveying of bore holes by the so-called go-devil method.

In the patent to Roland Ring 2,246,319, dated June 17, 1941, and in an application of said Roland Ring, Serial No. 379,835, filed February 20, 1941, there are described an instrument and methods of operating the same, which instrument is characterized by a slow and continuous marking action, specifically electrolytic in character, whereby a record of the position of the instrument within a bore hole is made only when the instrument remains stationary for an extended period of time. For a better understanding of the nature of the present invention, which is not, however, limited for its application to said instrument of the above mentioned patent and application, the operation of said instrument may be described as follows:

If the instrument is run into a bore hole, either within a drill stem or in an open hole by means of a wire line or cable, the movements of the instrument incidental to its descent into the hole cause a pendulum to move about relative to a record member, so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period upwards of about one minute, with the result that the electrolytic action is concentrated at one point of the record member and an easily distinguishable spot is made thereon. If it is then desired to make one or more additional records at other levels, the instrument is moved to these successive levels and permitted to remain at them for different periods of time, with the result that marks differing in intensity and/or size are produced which, by their nature, can be identified with the particular levels through a knowledge of the relative times during which the instrument was stationary. Following the completion of the record or records, the instrument is then withdrawn continuously from the hole and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with surveying instruments involves their being dropped freely through a drill stem so that they come to rest in a position adjacent the bit. During this location in a position of rest, a record is made under the control of suitable timing means, and the instrument is then recovered when the bit is brought to the surface. Generally speaking, such go-devil records are made at a time when it is necessary to bring the bit to the surface to check the progress of the drill.

In the use of said ring instrument in go-devil fashion, the motion of the instrument through the drill stem prevents the making of any record during its fall, and a record is then made by holding the drill stem stationary for a sufficient period of time while the instrument rests adjacent the bit. If the drill stem was then raised and dismantled by continuous work of the drilling crew, the instrument would be subject to sufficiently continous agitation, with only quite limited periods of rest, so that no record obliterating markings would be produced on the record member. However, it is not usual for a derrick crew to work continuously in removing a drill stem from deep holes, and generally speaking, even if some mechanical reason for delay does not occur, the workman, after raising the drill stem part way, will take a short period of rest before proceeding further. If an instrument of the Ring type is in the drill stem during such a period of rest, or any other period of stationary condition of the drill stem, it will be obvious that another record will be made which might be indistinguishable from the desired record unless a substantially different time of rest is involved, and even then in some rare instances, particularly where the hole is substantially straight, the two records may overlap so that the significance of the original one is lost. It is generally not desirable to rotate the drill stem during such a period of interruption of its withdrawal, and consequently, such rotation is not a practical solution to the problem.

The present invention relates to the provision of means for terminating the recording action at a desired time, being particularly useful for termination of the recording action following the completion of a single record or a series of records.

This and other objects of the invention, particularly relating to details, will become apparent from the following description, read in conjunction with the accompanying drawing, in which:

Figures 1A and 1B are respectively longitudinal sectional views through the lower and upper portions of a well surveying instrument; and Figure 2 is a transverse section taken on the plane indicated at 2—2 in Figure 1B.

The instrument illustrated in the drawing is basically of the type disclosed in said Ring patent and application and comprises an inner casing adapted to be located in a fluid-tight protective casing in use. The inner casing comprises tubes 2, 4 and 6 joined by coupling members 8 and 10. Threaded into the bottom of the lowermost tube 2 is a plug 12, on which may be secured the record member 16 by means of a threaded ring 14 provided with a flange overlapping the edge of the record member. This record member, as described in detail in said Ring patent and application, preferably comprises a sheet of paper containing a colored material such as a colored metallic ferrocyanide which, upon the passage of an electrical current while it is moist will be marked with a white spot by reason of the formation of alkali at a cathode provided by a metallic point 18 slidable within a pendulum 20 mounted for universal pivotal movement in a bearing arrangement 22. An insulating ring 24 prevents short circuiting by preventing contact of the pendulum with the metallic wall of the tube 2.

The bearing 22 has a mounting which is insulated by means of insulating bushings 26 from the casing of the instrument and interposed electrically between the bearing and a contact point 30 is a current limiting or stabilizing resistor 28 of rather high resistance, for example of the order of 100,000 ohms. Engaging the point 30 is the lowermost of one or more batteries indicated at 32 insulated by a suitable sleeve from the tube 4. These batteries are arranged in series with the positive pole in the uppermost position engaged with the pin 34 spring pressed downwardly by a spring 36, which engages a pin 38, the two pins 34 and 38 and spring 36 being insulated from the metallic portions of the apparatus by means of suitable insulating bushings.

Up to this point, the instrument is substantially conventional and as illustrated in said Ring application. In accordance with the Ring application, the equivalent of the pin 38 would be grounded to the casing of the instrument when in operation so as to close the circuit through the batteries, the resistance, the pendulum and the record member. In the present instance, a centrifugal switching means is interposed in the circuit.

For this purpose, the top plug 42 of the instrument which is provided with a key way 44 engageable with a lug to hold the instrument in its protective casing, carries a rod 46 extending axially of the instrument and entering a suitable hole in the coupling section 10. Secured to the plug 42 are a plurality of leaf springs 48, in this case four in number. At their lower ends, these leaf springs are connected to a collar 50, slidable on the rod 46. At their central portions, they carry weights 52, the inner longitudinal surfaces of which approach quite close to the rod 46. There is, however, substantial clearance provided between the leaf springs and the tube 6, as indicated. The collar 50 is provided with an angular reduced portion 54 adapted in the position illustrated in Figure 1B to hold against the pressure of a spring 60 a finger 56 pivoted on a transverse pin 58 and provided at its lower end below the pivot with a leaf spring 62 carrying a contact point 64 engageable with an exposed portion 40 of the pin 38. In the operation of the instrument, it is located within a protective casing and dropped through a drill stem, the record member having been moistened so as to become conductive. During the period of dropping, the electrical circuit is continuously closed through the point 18 of the pendulum, the circuit including the contact between the point 64 and the portion 40 of the pin 38. As indicated above, however, the motion of the pendulum during the movement through the drill stem prevents any substantial marking of the record member from occurring. After the instrument has time to reach a position of rest adjacent the bit, resting on a suitable bridge or merely upon a shoulder provided by a reduced passage through the bit, all motion of the drill stem is interrupted for a period sufficient for a record to be made. Thereupon the drill stem may be immediately rotated or partially withdrawn and then at some suitable time rotated to effect opening of the electrical circuit. This opening occurs upon rotation of the drill stem through, say, one or more revolutions by reason of the fact that the weights 52 are thrown centrifugally outwardly, flexing the leaf springs outwardly and thereby drawing the collar 50 upwardly along the rod 46. The arrangement is such that this action will lift the collar 50 clear of the upper end of the finger 56. As soon as this occurs, the spring 60 will force the finger outwardly to the dotted line position indicated in Figure 1B, breaking the electrical contact. If, then, the rotation ceases, the inward flexure of the springs 48 will tend to move the collar 50 downwardly, but this downward movement is arrested by its engagement with the upper end of the finger 56. As a result, the circuit is not remade. Accordingly, if, thereafter, the drill stem is stationary over any extended period of time, the record member will not be further marked. In fact, if for some reason it is not necessary to read the record immediately, the instrument may be set aside even in an upright position, and no record will be made. Normally, the instrument is so arranged that interruption of the circuit occurs upon inverting it by reason of the fact that the pin 18 will drop within the pendulum out of contact with the record disc.

It will be evident that the circuit may be remade for a subsequent operation merely by the operator's pressing inwardly the lower portion of the finger 56 through the opening 66 in the coupling 10. When this is done, the upper end of the finger will clear the collar 50 and permit it to move into the position illustrated, wherein it will retain the finger 56 in circuit closing position.

The arrangement illustrated is designed to prevent accidental opening of the circuit except upon rotation of the instrument through the drill stem. If a shock imparted to the instrument could cause the simultaneous outward movement of all four of the leaf springs to corresponding extents, such a shock, by lifting the collar 50, might open the electrical circuit. But the probability that this can occur is infinitesimal, since substantially any shock that may be imparted to the instrument would tend to cause all of the weights 52 to move in the same direction, which would mean that one or more of them would have to move in a direction toward the rod 46. As mentioned above, the clearance for movement in this direction is small, and consequently an extent of movement sufficient to raise the collar 50 to clear the finger 56 is impossible. The setting up of vibrations which might effect movement of the collar 50 is also impossible for this same reason, i. e., since the weights 52 cannot move to any extent inwardly, it is substantially impossible that amplitudes of vibration could be set up which, by corresponding in phase, would raise the collar. Inertial movements lengthwise of the rod 46 can also be made to have substantially no effect merely by providing a very slight initial inward bowing of the springs 48. The system is, in fact, extremely stable against any motions except rotary ones, and since, by a suitable proportioning of the masses of the weights 52 and the tension of the springs 48, a centrifugal outward movement of the springs sufficient to move the collar 50 to open the switch may be prevented except for a predetermined speed of rotation, incidental slow rotation of the instrument occurring during its drop through the drill stem, or slight angular movements of the drill stem occurring before a switch opening rotation will be completely ineffective to break the circuit.

While the centrifugally controlled switch has been described specifically in connection with the Ring type instrument, it will be evident that it is applicable in the case of many other surveying instruments involving an electrical circuit arranged to effect some control. It may also be noted that the control may be effected through closure rather than opening of a circuit upon centrifugal action. In fact, this Ring type instrument is a good example of such possibility since the switch might well be arranged in a circuit shunting the point of engagement of the pin 18 with the record member. If closed to short circuit this contact, the recording action would cease. If the switch was arranged in series with a high resistance such as 28, this short circuiting action would not result in any current drain on the batteries of a damaging character.

It will be evident that various changes may be made in the specific embodiment of the invention, and particularly in the arrangement of the centrifugal device to render it proof against response to accidental vibration by the use of damping means of known type.

What we claim and desire to protect by Letters Patent is:

1. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising devices responsive to rotation of said casing to effect said control.

2. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising switching elements and devices responsive to rotation of said casing to effect relative movements of said switching elements.

3. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising devices responsive to rotation of said casing to effect said control, said devices including a plurality of weighted spring elements secured to each other at their upper and lower ends and arranged to deflect upon the application of centrifugal forces.

4. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising devices responsive to rotation of said casing to effect said control, said devices including a plurality of weighted spring elements secured to each other at one set of ends thereof, a collar to which said elements are secured at their opposite ends, and means for guiding said collar for movement in the direction of the axis of the casing but preventing movement of the collar transversely to said axis, said spring elements being arranged to deflect upon the application of centrifugal forces.

5. A well surveying instrument comprising a casing adapted to enter a bore hole, means for supporting a record member within said casing, means, comprising an electrical circuit, for effecting marking of said record member in accordance with the position of said casing, and means for controlling flow of current in said circuit, said means comprising a spring urged switch element, and means normally restraining said element from movement under the spring action but arranged to trip the switch element in response to rotation of said casing.

6. A well surveying instrument comprising a casing adapted to enter a bore hole, means for supporting a record member within said casing, means responsive to the position of the instrument for effecting slow marking of said record member, said responsive means being subject to disturbance by movements of the instrument and being active without interruption for any substantial time during an extended period of location of the instrument within a bore hole to effect such marking, the rate at which appreciable marking of said record member occurs being so low that during movements of the instrument during said extended period no appreciable marking occurs, and centrifugally controlled means for interrupting said marking so that, following a marking operation during a stationary period of said instrument, marking during a subsequent stationary period may be prevented by rotation of the instrument.

WILLIAM H. EMERSON.
DONALD HERING.